US012644517B2

(12) United States Patent
Faggiani et al.

(10) Patent No.: US 12,644,517 B2
(45) Date of Patent: Jun. 2, 2026

(54) SYSTEM AND METHOD FOR SHIFTING TWO SPEED TRANSMISSION

(71) Applicant: DANA ITALIA S.R.L., Arco (IT)

(72) Inventors: Giacomo Faggiani, Rovereto (IT); Pier Paolo Rinaldi, Arco (IT); Matteo Cocetti, Arco (IT); Sara Gennari, Arco (IT)

(73) Assignee: DANA ITALIA S.R.L., Arco (IT)

( * ) Notice: Subject to any disclaimer, the term of this patent is extended or adjusted under 35 U.S.C. 154(b) by 107 days.

(21) Appl. No.: 18/590,418

(22) Filed: Feb. 28, 2024

(65) Prior Publication Data

US 2025/0271061 A1    Aug. 28, 2025

(51) Int. Cl.
   *F16H 63/50*     (2006.01)
   *F16H 59/46*     (2006.01)
   *F16H 61/04*     (2006.01)
(52) U.S. Cl.
   CPC ........... *F16H 63/502* (2013.01); *F16H 59/46* (2013.01); *F16H 61/0403* (2013.01)
(58) Field of Classification Search
   CPC ................................ F16H 63/502; F16H 59/46
   See application file for complete search history.

(56) References Cited

U.S. PATENT DOCUMENTS 11,584,358 B2 *  2/2023  Piracha .................... B60K 6/26

FOREIGN PATENT DOCUMENTS

EP          3936737 A1     1/2022
WO     2020046974 A1     3/2020

OTHER PUBLICATIONS

Gennari, S. et al., "Automatic Backlash-Compensation for a Dog Clutch in an Electrified Transmission," U.S. Appl. No. 18/492,192, filed Oct. 23, 2023, 76 pages.

* cited by examiner

*Primary Examiner* — Derek D Knight
(74) *Attorney, Agent, or Firm* — McCoy Russell LLP

(57)        ABSTRACT

Methods and systems for shifting a transmission that includes a dog clutch are described. In one example, the transmission may be coupled to an electric machine and a rotational speed of the electric machine may be adjusted to reduce a speed differential between rotating transmission components. A position of a shifter actuator may be adjusted according to an estimate of when the speed differential is equal to a predetermined value.

13 Claims, 13 Drawing Sheets

1500

SYSTEM AND METHOD FOR SHIFTING TWO SPEED TRANSMISSION

TECHNICAL FIELD

The present disclosure relates to shifting a two speed transmission of an electric vehicle.

BACKGROUND AND SUMMARY

Off-highway battery electric vehicles may operate with large speed and load ranges. For example, a rock truck may carry a large load that requires a large amounts of torque for the increasing the rock truck's speed from rest. However, at times, the rock truck may be empty and it may be desirable to move it from one location to another location in a short period of time. Therefore, it may be desirable for the rock truck to reach higher speeds. A single speed transmission in the off-highway battery electric vehicle may not make it possible for the off-highway battery electric vehicle to operate within a desired speed and load operating range. Therefore, a two speed transmission may be installed in the off-highway battery electric vehicle. The two speed transmission may allow the vehicle to operate at higher vehicle speed while generating sufficient torque to propel a vehicle that is highly loaded at lower vehicle speeds. Nevertheless, shifting the two speed transmission may not be as simple as may be desired because electric machines may rotate at relatively high speeds that may result in a large speed gap between rotational speed of a first transmission shaft (e.g., an input shaft) and rotational speed of a second transmission shaft (e.g., an output shaft). The large speed gap between transmission shaft rotational speeds may make it more difficult for synchronizers to equalize the speed between the two shafts so that a shift may be brought about. Consequently, the amount of time for a shift to occur may be extended longer than may be desired and vehicle drivability may degrade.

The inventors herein have recognized the above-mentioned issues and have developed an electric propulsion system, comprising: an electric machine; a step gear ratio transmission including at least two gear ratios, the transmission including a shifter actuator; and one or more controllers including executable instructions that cause the one or more controllers to estimate an amount of time for a differential speed between a rotational speed of an on-coming gear and a rotational speed of a transmission shaft to be less than a threshold rotational speed.

By estimating an amount of time it takes for a differential speed between two transmission components to be equal to or less than a predetermined amount, it may be possible to provide the technical result of coordinating shifter movement with component speed synchronization so that an amount of time it takes to shift gears of a transmission may be reduced. In addition, a dog clutch may be engaged smoothly since the approach is based on rotational speeds of components in the transmission being synchronized.

The present description may provide several advantages. In particular, the approach may make reduce an amount of time it takes to shift transmission gears. Further, the approach may allow a shifter to engage a dog clutch so that a possibility of shift shock may be reduced. Additionally, the approach may reduce dog clutch wear.

It is to be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not restricted to implementations that solve any disadvantages noted above or in any part of this disclosure.

DETAILED DESCRIPTION

Figure 1:
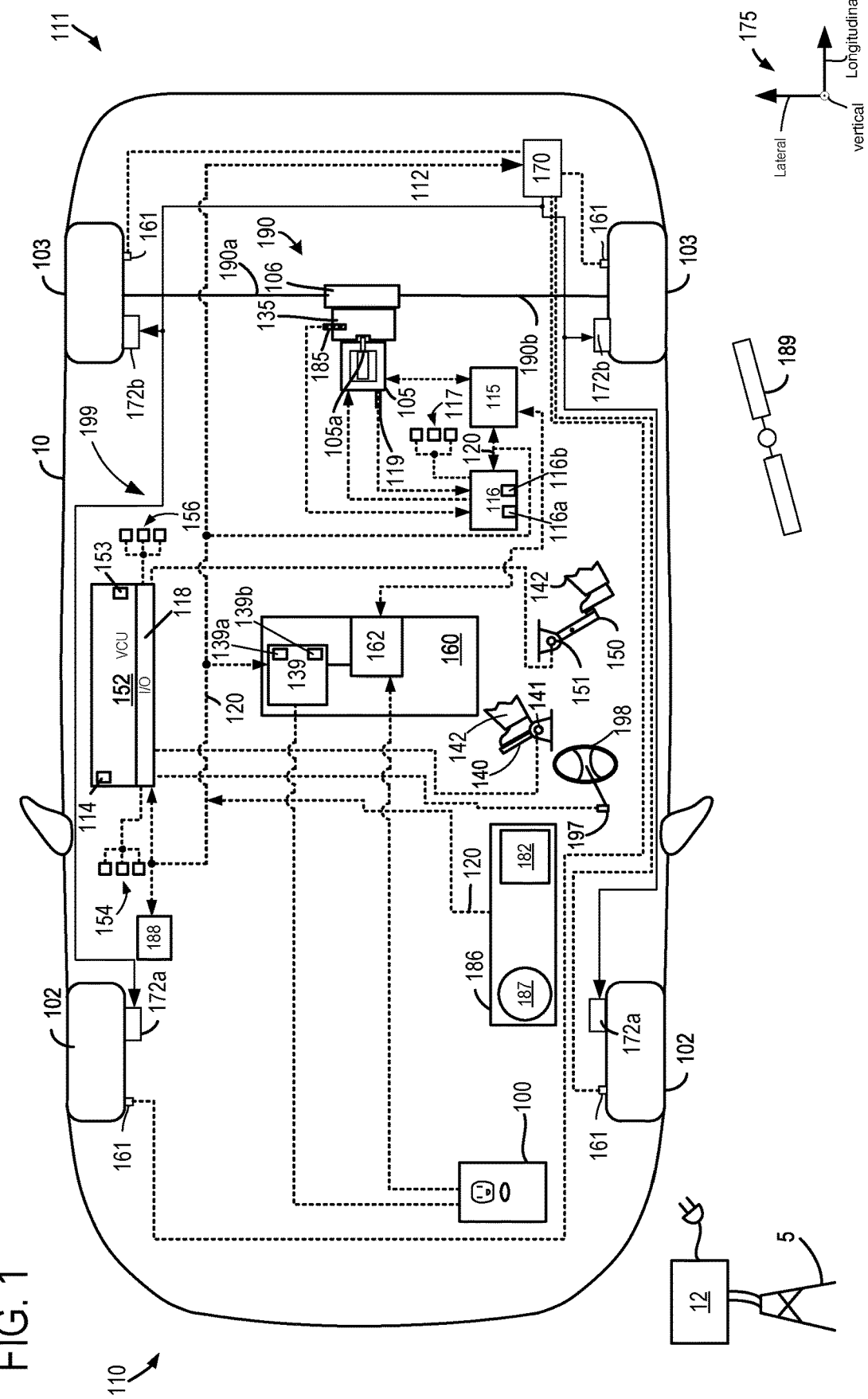
FIG. 1 is an illustration of an example vehicle that includes an electric vehicle propulsion system.
Figure 13:
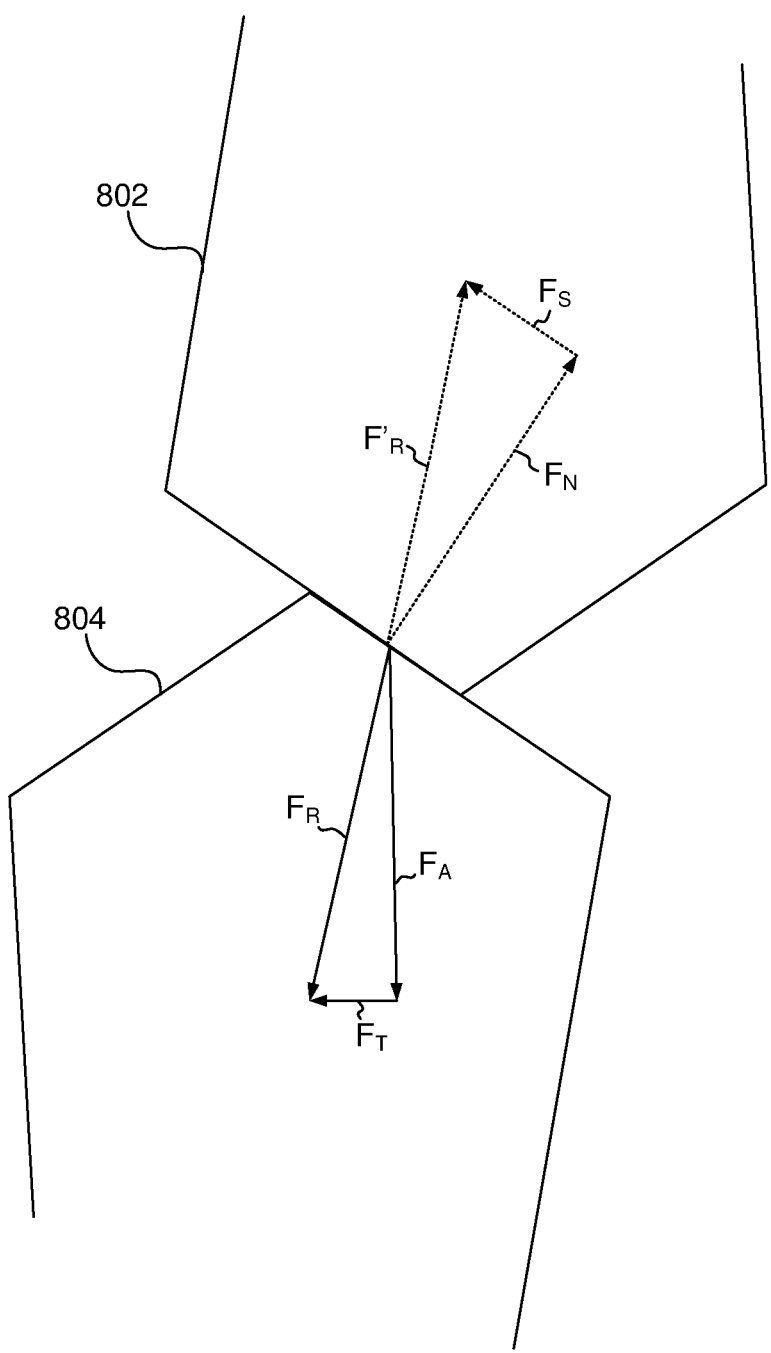
Figure 14:
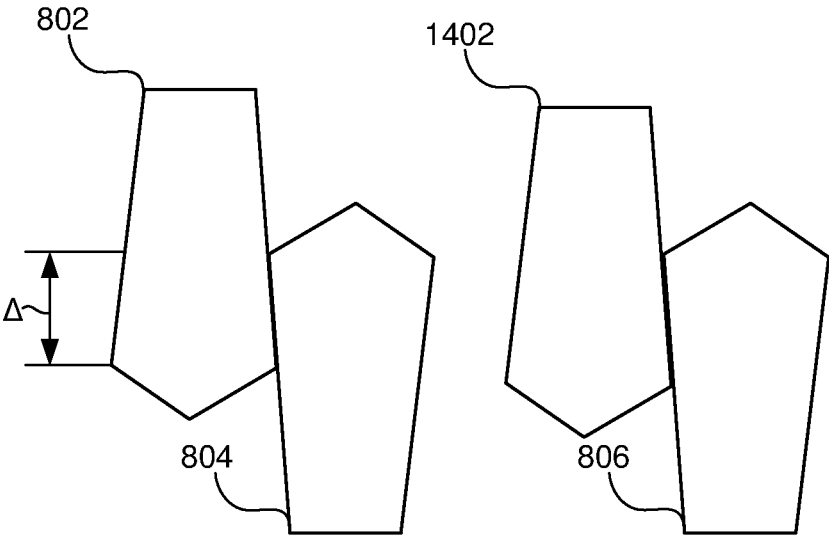
Figure 15:
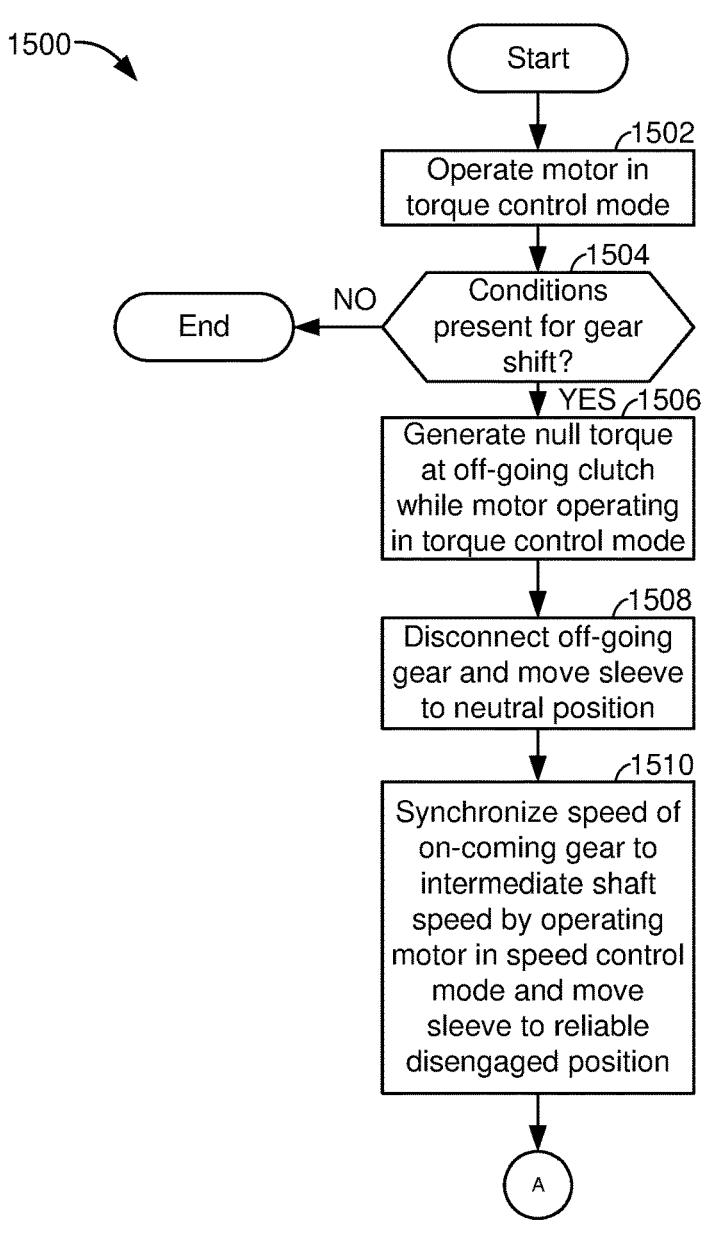
FIG. 15 shows a flow chart of an example method for shifting gears of a transmission.
Figure 16:
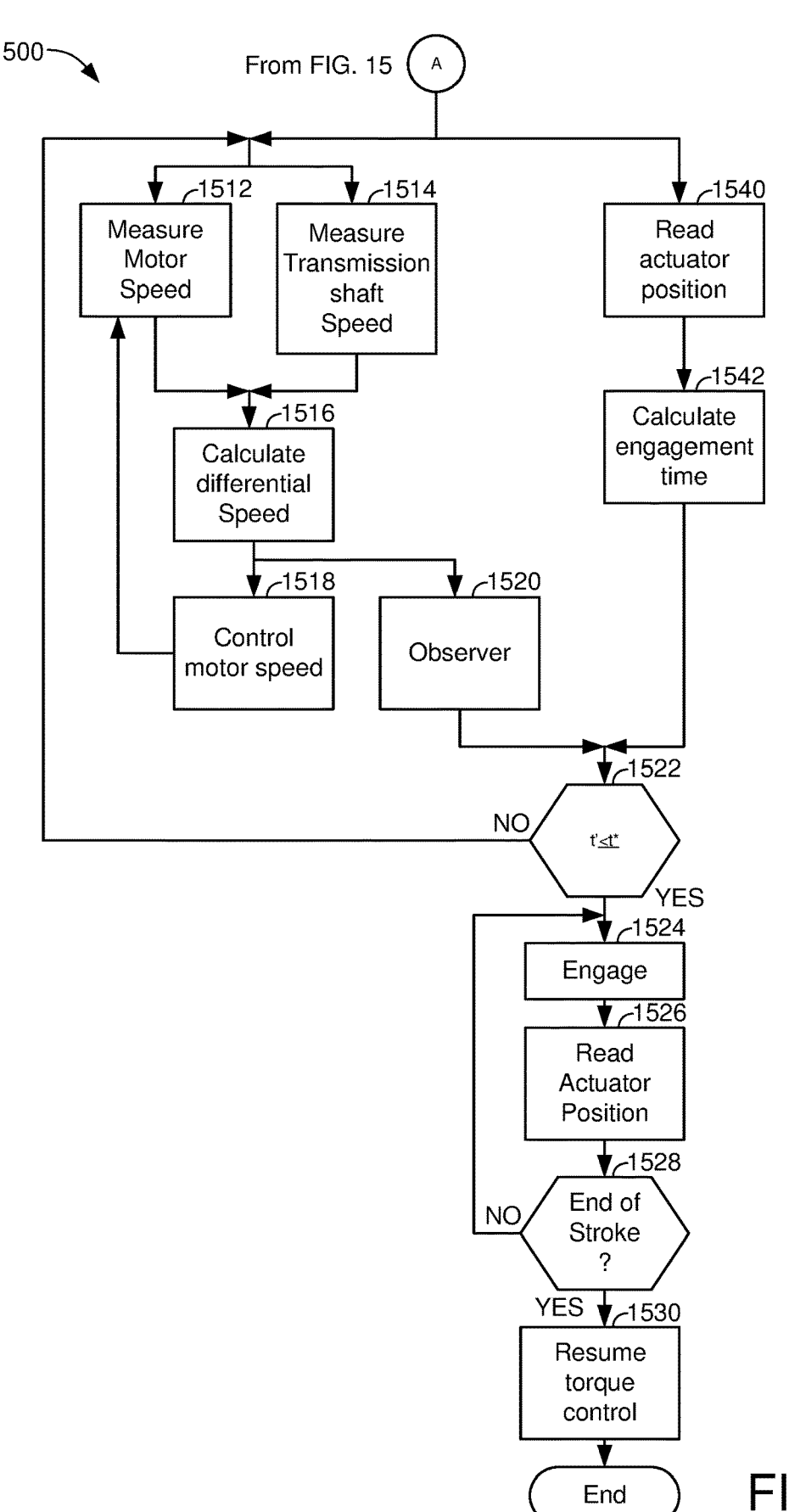
FIG. 16 shows a flow chart of an example method for operating a gear shift actuator of a transmission.

A method and system for shifting a transmission is described. The transmission may be a two speed transmission (e.g., a transmission with two forward gear ratios) or a transmission having more than two gear ratios. The transmission shifting may include predicting a speed differential and an amount of time to move a shifter so that shift delay may be reduced. By reducing the shift delay, the transmission may be operated in a state where torque is not transferred through the transmission for a shorter period of time, thereby increasing torque delivery to the vehicle's wheels. The transmission may be included in an electric vehicle as shown in FIG. 1. The transmission may be of the type shown in FIG. 2 and having a dog clutch as shown in FIG. 3 that operates as shown in FIGS. 4-14. A method for shifting gears of a transmission is shown in FIG. 15 and a method for controlling a gear shift actuator is shown in FIG. 16.

FIG. 1 illustrates an example vehicle propulsion system 199 for vehicle 10. In FIG. 1 mechanical connections between the various components are illustrated as solid lines, whereas electrical connections between various components are illustrated as dashed lines. Vehicle front end is indicated at 110 and vehicle rear end is indicated at 111. Vehicle 10 travels in a forward direction when vehicle front end 110 leads movement of vehicle 10. Vehicle 10 travels in a reverse direction when vehicle rear end 111 leads movement of vehicle 10. In this example, vehicle 10 is a rear wheel drive vehicle, but in other examples, vehicle 10 may be a four-wheel drive or front wheel drive vehicle.

Vehicle propulsion system 199 includes a propulsion source 105 (e.g., an electric machine, such as a motor), but in other examples two or more propulsion sources may be provided. In one example, propulsion source 105 may be a synchronous or induction electric machine that may operate as a motor or generator. In other examples, propulsion source 105 may be a direct current (DC) machine. Vehicle propulsion system 199 also includes a transmission 135. The propulsion source 105 is fastened to the transmission 135 and propulsion source 105 delivers power from its rotor 105*a* to transmission 135. Transmission 135 may be mechanically coupled to differential gears. Differential gears 106 may be coupled to two axle shafts, including a first or right axle shaft 190*a* and a second or left axle shaft 190*b*. Vehicle 10 further includes front wheels 102 and rear wheels 103.

Figure 2:
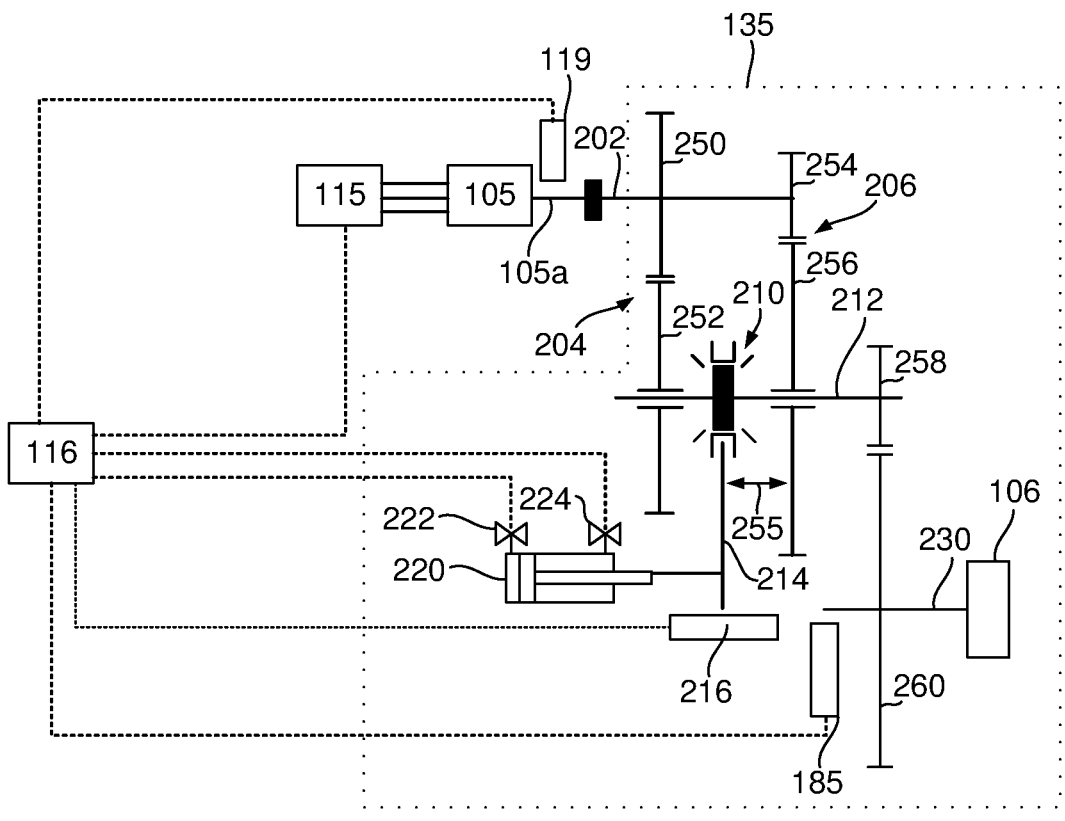
FIG. 2 shows a stick diagram of one example two gear ratio transmission configuration.
Figure 3:
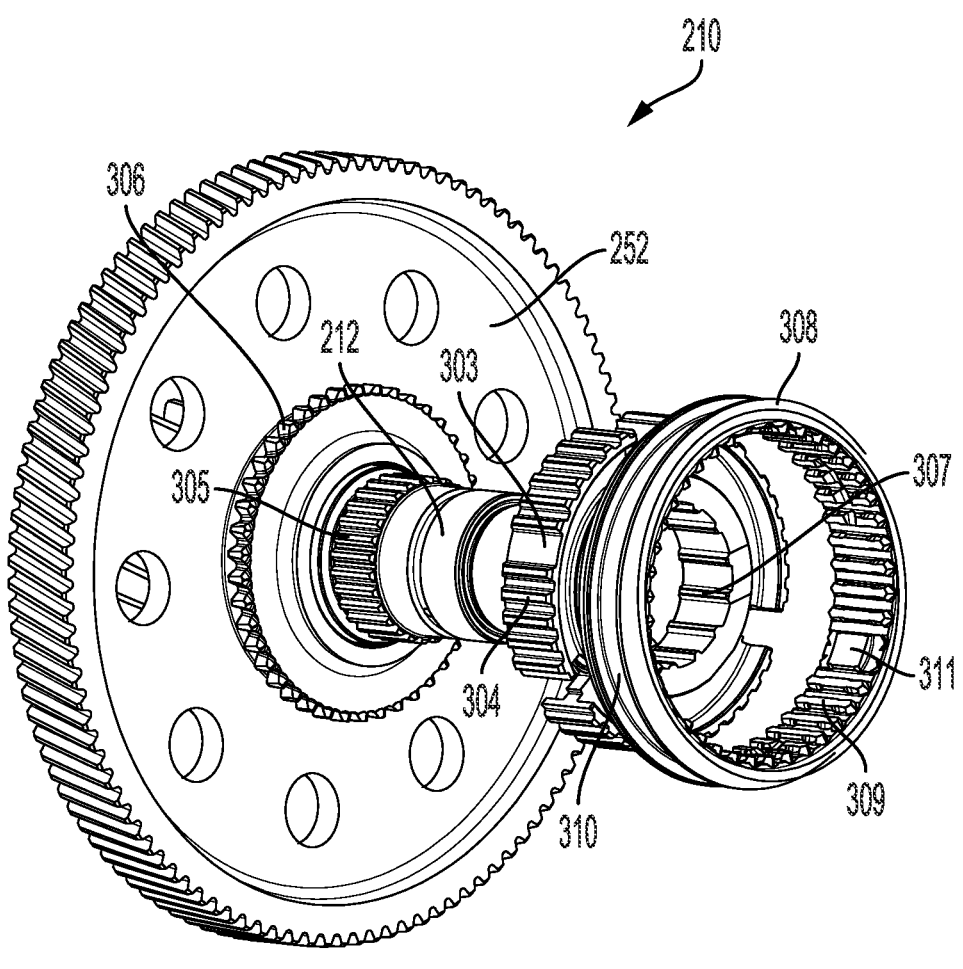
FIG. 3 shows an example dog clutch.

The transmission 135 may be referred to as a step ratio transmission and it may be configured as shown in greater detail in FIG. 2, or alternatively, a different configuration. Transmission 135 may include one or more clutch actuators (not shown) to shift one or more clutches. Transmission 135 may include a first speed sensor 119 for sensing a rotational speed of propulsion source 105 and a second speed sensor 185 for sensing a transmission output shaft speed. Electric power inverter 115 is electrically coupled to propulsion source 105 to convert DC power to alternating current (AC) and vise-versa. Powertrain controller 116 is electrically coupled to sensors 117 and actuators of vehicle propulsion system 199. For example, sensors 117 may include, but are not limited to inverter switch temperature sensors, electric machine winding temperature sensors, bus bar temperature sensors, etc.

Transmission 135 may transfer mechanical power to or receive mechanical power from differential gears 106. Differential gears 106 may transfer mechanical power to or receive mechanical power from rear wheels 103 via right axle shaft 190*a* and left axle shaft 190*b*. Propulsion source 105 may consume alternating current (AC) electrical power provided via electric power inverter 115. Alternatively, propulsion source 105 may provide AC electrical power to electric power inverter 115. Electric power inverter 115 may be provided with high voltage direct current (DC) power from battery 160 (e.g., a traction battery, which also may be referred to as an electric energy storage device or battery pack). Electric power inverter 115 may convert the DC electrical power from battery 160 into AC electrical power for propulsion source 105. Alternatively, electric power inverter 115 may be provided with AC power from propulsion source 105. Electric power inverter 115 may convert the AC electrical power from propulsion source 105 into DC power to store in battery 160.

Propulsion source 105 may transfer mechanical power to or receive mechanical power from transmission 135. As such, transmission 135 may be a multi-speed gear set that may shift between gear ratios when commanded via powertrain controller 116. Powertrain controller 116 includes a processor 116*a* and memory 116*b*. Memory 116*b* (e.g., storage media) may include read exclusive memory, random access memory, and keep alive memory. The memory may be programmed with computer readable data representing instructions that are executable by a processor for performing the methods and control techniques described herein as well as other variants that are anticipated but not specifically listed. As such, control techniques, methods, and the like expanded upon herein may be stored as instructions in non-transitory memory.

Battery 160 may periodically receive electrical energy from a power source such as a stationary power grid 5 residing external to the vehicle (e.g., not part of the vehicle). As a non-restricted example, vehicle propulsion system 199 may be configured as a plug-in electric vehicle (EV), whereby electrical energy may be supplied to battery 160 via the stationary power grid 5 and charging station 12. Electric charge may be delivered to battery 160 via plug receptacle 100.

Battery 160 may include a BMS controller 139 (e.g., a battery management system controller) and an electrical power distribution box 162. BMS controller 139 may provide charge balancing between energy storage elements (e.g., battery cells) and communication with other vehicle controllers (e.g., vehicle control unit 152). BMS controller 139 includes a core processor 139*a* and memory 139*b* (e.g., random-access memory, read-exclusive memory, and keep-alive memory).

Vehicle 10 may include a vehicle control unit (VCU) 152 that may communicate with electric power inverter 115, powertrain controller 116, friction or foundation caliper controller 170, global positioning system (GPS) 188, BMS controller 139, and dashboard 186 and components included therein via controller area network (CAN) 120. VCU 152 includes memory 114, which may include read-exclusive memory (ROM or non-transitory memory) and random access memory (RAM). VCU also includes a digital processor or central processing unit (CPU) 153, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not restricted to lateral accelerometers, longitudinal accelerometers, yaw rate sensors, inclinometers, temperature sensors, battery voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and caliper application pedal position sensor 151. Actuators may include but are not constrained to inverters, transmission controllers, display devices, human/machine interfaces, friction caliper systems, and battery controller described herein.

Driver demand pedal position sensor 141 is shown coupled to driver demand pedal 140 for determining a degree of application of driver demand pedal 140 by human 142. Caliper application pedal position sensor 151 is shown coupled to caliper application pedal 150 for determining a degree of application of caliper application pedal 150 by human 142. Steering angle sensor 197 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system 199 may also include a dashboard 186 that an operator of the vehicle may interact with. Dashboard 186 may include a display system 187 configured to display information to the vehicle operator. Display system 187 may comprise, as a non-restricting example, a touchscreen, or human machine interface (HMI), display which enables the vehicle operator to view graphical information as well as input commands. In some examples, display system 187 may be connected wirelessly to the internet (not shown) via VCU 152. As such, in some examples, the vehicle operator may communicate via display system 187 with an internet site or software application (app) and VCU 152.

Dashboard 186 may further include an operator interface 182 via which the vehicle operator may adjust the operating status of the vehicle. Specifically, the operator interface 182 may be configured to activate and/or deactivate operation of the vehicle driveline (e.g., propulsion source 105) based on an operator input. Further, an operator may request an axle mode (e.g., park, reverse, neutral, drive) via the operator interface. Various examples of the operator interface 182 may include interfaces that utilize a physical apparatus, such as a key, that may be inserted into the operator interface 182 to activate the vehicle propulsion system 199 including propulsion source 105 and to turn on the vehicle 10. The apparatus may be removed to shut down the transmission 135 and propulsion source 105 to turn off vehicle 10. Propulsion source 105 may be activated via supplying electric power to propulsion source 105 and/or electric power inverter 115. Propulsion source 105 may be deactivated by ceasing to supply electric power to propulsion source 105 and/or electric power inverter 115. Still other examples may additionally or optionally use a start/stop button that is manually pressed by the operator to start or shut down the propulsion source 105 to turn the vehicle on or off. In other examples, a remote electrified axle or electric machine start may be initiated remote computing device (not shown), for example a cellular telephone, or smartphone-based system where a user's cellular telephone sends data to a server and the server communicates with the vehicle control unit 152 to activate the inverter 115 and propulsion source 105. Spatial orientation of vehicle 10 is indicated via axes 175.

Vehicle 10 is also shown with a foundation or friction caliper controller 170. Friction caliper controller 170 may selectively apply and release friction calibers (e.g., 172a and 172b) via allowing hydraulic fluid to flow to the friction calipers. The friction calipers may be applied and released so as to reduce locking of the friction calipers to front wheels 102 and rear wheels 103. Wheel position or speed sensors 161 may provide wheel speed data to friction caliper controller 170. Vehicle propulsion system 199 may provide torque to rear wheels 103 to propel vehicle 10.

A human or autonomous driver 142 may request a driver demand wheel torque, or alternatively a driver demand wheel power, via applying driver demand pedal 140 or via supplying a driver demand wheel torque/power request to vehicle control unit 152. Vehicle control unit 152 may then demand a torque or power from propulsion source 105 via commanding powertrain controller 116. Powertrain controller 116 may command electric power inverter 115 to deliver the driver demand wheel torque/power via electrified axle 190 and propulsion source 105. Electric power inverter 115 may convert DC electrical power from battery 160 into AC power and supply the AC power to propulsion source 105. Propulsion source 105 rotates and transfers torque/power to transmission 135. Transmission 135 may supply torque from propulsion source 105 to differential gears 106, and differential gears 106 transfer torque from propulsion source 105 to rear wheels 103 via axle shafts 190a and 190b.

During conditions when the driver demand pedal is fully released, vehicle control unit 152 may request a small negative or regenerative power to gradually slow vehicle 10 when a speed of vehicle 10 is greater than a threshold speed. The amount of regenerative power requested may be a function of driver demand pedal position, battery state of charge (SOC), vehicle speed, and other conditions. If the driver demand pedal 140 is fully released and vehicle speed is less than a threshold speed, vehicle control unit 152 may request a small amount of positive torque/power (e.g., propulsion torque) from propulsion source 105, which may be referred to as creep torque or power. The creep torque or power may allow vehicle 10 to remain stationary when vehicle 10 is on a small positive grade.

The human or autonomous driver may also request a negative or regenerative driver demand slowing torque, or alternatively a driver demand slowing power, via applying caliper pedal 150 or via supplying a driver demand slowing power request to vehicle control unit 152. Vehicle control unit 152 may request that a first portion of the driver demanded slowing power be generated via propulsion source 105 via commanding powertrain controller 116. Additionally, vehicle control unit 152 may request that a portion of the driver demanded slowing power be provided via friction calipers 172a and 172b via commanding friction caliper controller 170 to provide a second portion of the driver requested slowing power.

After vehicle control unit 152 determines the slowing power request, vehicle control unit 152 may command powertrain controller 116 to deliver the portion of the driver demand slowing power allocated to propulsion source 105. Propulsion source 105 may convert the vehicle's kinetic energy into AC power.

Powertrain controller 116 includes predetermined transmission gear shift schedules whereby fixed ratio gears of transmission 135 may be selectively engaged and disengaged. Shift schedules stored in powertrain controller 116 may select gear shift points or events as a function of driver demand wheel torque and vehicle speed.

Turning now to FIG. 2, a stick diagram of transmission 135 is shown. In this example, transmission 135 is a step transmission with two gear ratios (e.g., a first lower gear ratio 206 and a second higher gear ratio 204). In other examples, transmission 135 may include additional gear ratios.

Transmission 135 includes input shaft 202 for receiving mechanical torque from propulsion source 105. Propulsion source 105 is supplied with electric power via inverter 115 and a traction battery (not shown). Rotational speed of propulsion source 105 and input shaft 202 may be determined via first speed sensor 119. Gear 250 and gear 254 are fixed to input shaft 202 and these gears rotate at a same speed as input shaft 202. Gear 250 is meshed with second idler gear 252 and gear 254 is meshed with first idler gear 256. Gear 250 and gear 252 along with gears 258 and 260 may form a second higher gear ratio (e.g., second gear). Gear 254 and gear 256 along with gears 258 and 260 may form a first lower gear ratio (e.g., first gear). Gears 252 and 256 may rotate freely about intermediate or layshaft 212 when dog clutch 210 is not engaged. Dog clutch 210 may selectively engage either gear 252 to engage the second higher gear or selectively engaged gear 256 to engage the first lower gear. Torque flow through transmission is interrupted when dog clutch 210 is not engaged to either of gears 252 and 256. Dog clutch 210 rotates with intermediate shaft so that when dog clutch 210 engages gear 252, gear 252 rotates at a same speed as intermediate shaft 212. Likewise, dog clutch 210 may engage gear 256 so that gear 256 rotates at a same speed as intermediate shaft 212. Intermediate shaft 212 rotates at a multiple of a rotational speed of output shaft 230. Intermediate shaft 212 includes gear 258 that meshes with gear 260 that is coupled to output shaft 230. Output shaft may rotate differential 106. Dog clutch 210 may be moved axially with respect to intermediate shaft 212 as indicated by arrow 255 via shift fork 214. Shift fork 214 may be move axially via gear shift actuator 220. Controller 116 may adjust a position of gear shift actuator 220 via adjusting hydraulic valve 222 and hydraulic valve 224. A position of shift fork 214 and a position of dog clutch 210 may be determined via shift position sensor 216. The positions of the speed sensors for the transmission may be different than those shown in FIG. 2 without affecting operation and control of transmission 135.

FIG. 3 shows an example dog clutch 210 of vehicle propulsion system 199. In FIG. 3, a gear 252 that may be selectively engaged by dog clutch 210 is shown. The other gear (e.g., gear 256) that may be engaged by dog clutch 210 is not shown for clarity. It may be appreciated that other dog clutch configurations are also possible.

Dog clutch 210 is a locking device that may selectively lock gear 252 to intermediate shaft 212 to engage a transmission gear (e.g., second gear). Gear 252 may freely rotate independent of the rotation of intermediate shaft 212 via needle bearing (not shown) that are between gear 252 and intermediate shaft 212. Hub 303 includes an inner spline 307 that is permanently mated with the spline 305 of gear 252 so that hub 303 is rotatably connected to shaft 212. Hub 303 is also axially fixed to shaft 212 via a couple of circlips (not shown). Sleeve 308 is rotatably connected to hub 303 by spline teeth pairs 304 and 309. Sleeve 308 may slide axially across hub 303. A fork (not shown) may drive axially sleeve 308 via grove 310. When sleeve 308 is urged towards gear 252, spline teeth 309 couples with both splines 306 and 304, thereby rotatably connecting gear 252 and shaft 212. Spline 306 may be referred to as engagement ring or locking ring. Sleeve 308 may travel towards gear 252 up to a position where end-stop 311 reaches tip of spline 306. A control strategy may adjust a speed of gear 252 within a close range of a speed of shaft 212 so that dog clutch may be engaged with minimal interference of teeth. In a strategy, synchronization is the operation of matching rotational speed of hub 303, which may be imposed by vehicle speed, with rotational speed of spline 306, which may be controlled via the traction motor. This operation may be referred to as electrical synchronization. Often, sleeve 310 moving apart from gear 301 will approach a gear of another ratio passing through a neutral position. This second gear is not represented for the sake of clarity.

Figure 4:
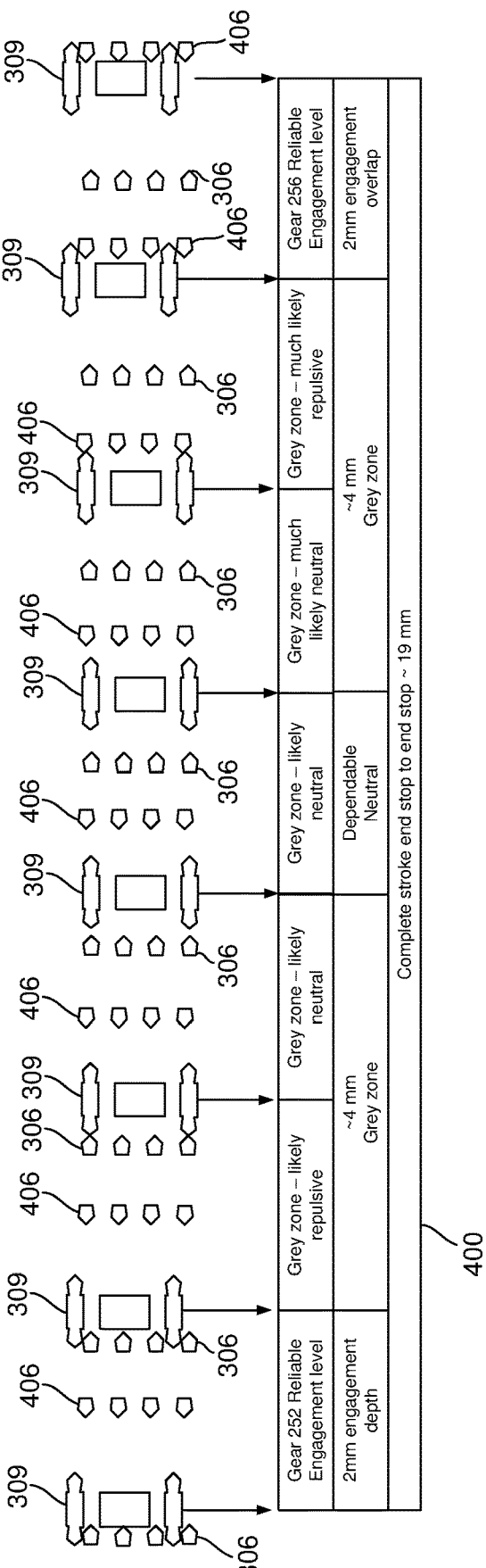
FIG. 4 shows operating states of a dog clutch during a gear shift sequence.

Referring now to FIG. 4, operating states of dog clutch teeth for a sequence where a first gear is disengaged and a second gear is engaged via a dog clutch is shown. The sequence begins on the left side of the figure and it ends on the right side of the figure. Table 400 indicates dog clutch engagement reliability levels and engagement depths from disengagement of gear 252 to engagement of gear 256.

Spline teeth 306 of gear 252 are indicated as polygons and spline teeth 406 of gear 256 are indicated as polygons. Spline teeth 309 of dog clutch 210 are shown positioned between spline teeth 306 and spline teeth 406 for each operating state. Each of the operating states is indicated by a group of spline teeth 306, spline teeth 309 of dog clutch 210, and a group of spline teeth 406.

At the left most side of FIG. 4, the spline teeth 309 of dog clutch 210 are fully engaged with the spline teeth 306 such that gear 252 (not shown) is locked to the intermediate shaft (not shown). Moving to the right, as gear 252 (not shown) is disengaged, spline teeth 309 of dog clutch 210 clear spline teeth 306 of gear 252 such that the transmission enters a neutral state. As the spline teeth 309 of dog clutch 210 (not shown) move right, the dog clutch moves from the neutral state to a repulsive state before becoming fully engaged at the right side of FIG. 4. There is substantial overlap between spline teeth 309 and spline teeth 406 when gear 256 is fully engaged.

Figure 5:
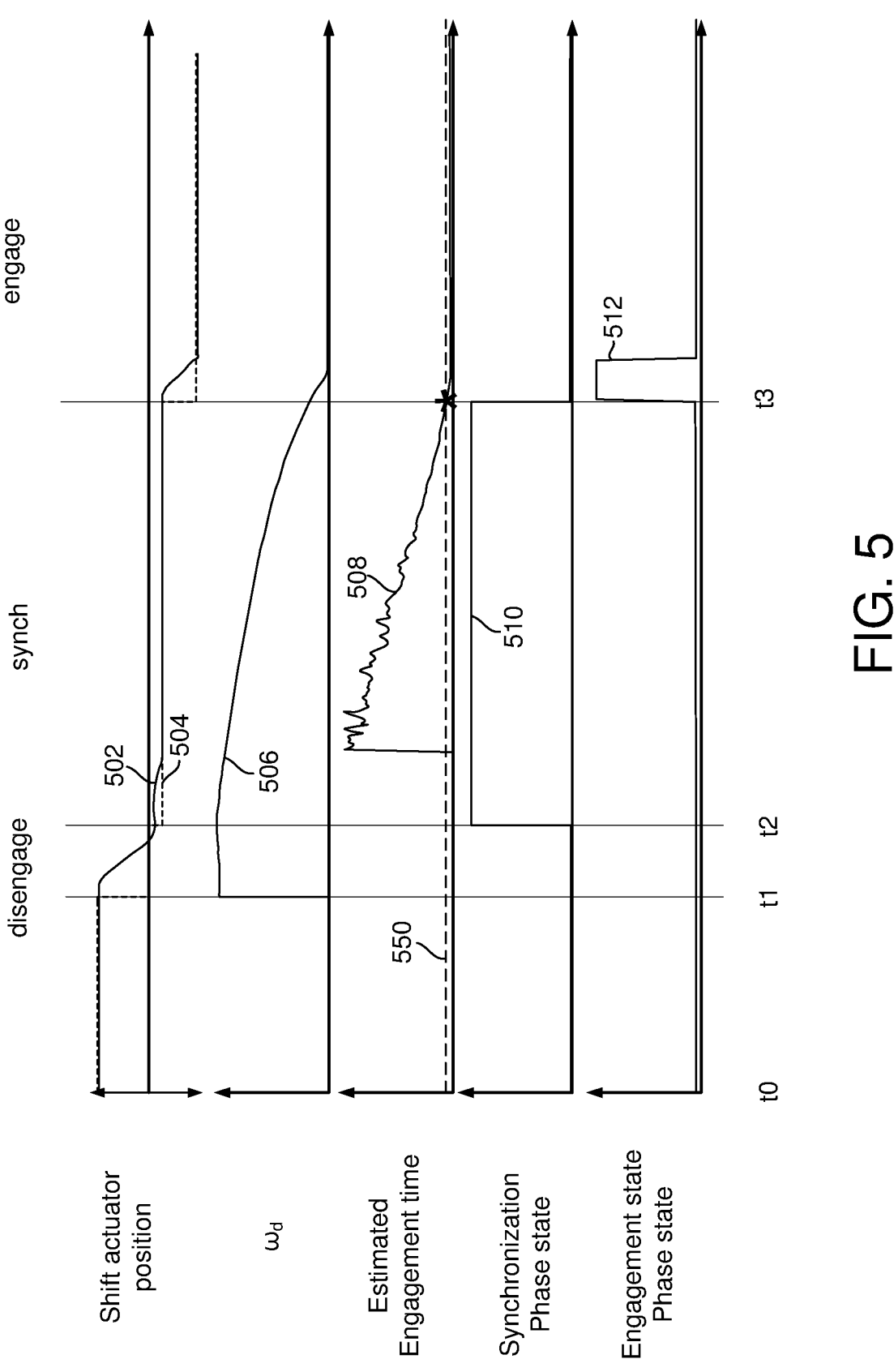
FIG. 5 shows signals of interest during a shifting sequence according to the present description.

Moving on to FIG. 5, a sequence of disengaging a first gear and engaging a second gear according to the method of FIG. 16 is shown. The sequence may be generated via the system of FIGS. 1-3 in cooperation with the method of FIG. 166.

The first plot from the top is a plot of shift actuator position versus time. The vertical axis indicates shifter position when engaging a first gear above axis and shifter position when engaging a second gear below the axis. The horizontal axis represents time and time increases from the left side of the plot to the right side of the plot. Solid line 502 represents actual actuator position and dashed line 504 represents target or requested actuator position.

The second plot from the top is a plot of a rotational speed difference between rotational speed of the disengaged gear and intermediate shaft rotational speed versus time. The vertical axis represents the rotational speed difference between the rotational speed of a disengaged gear (e.g., on-coming gear) and a rotational speed of the intermediate shaft. The horizontal axis represents time and time increases from the left side of the plot to the right side of the plot. Solid line 506 represents the rotational speed difference between rotational speed of the disengaged gear and intermediate shaft rotational speed versus time.

The third plot from the top is a plot of an estimated gear engagement time versus time. The vertical axis represents the estimated gear engagement time for the gear shift. The horizontal axis represents time and time increases from the left side of the plot to the right side of the plot. Solid line 508 represents the estimated gear engagement time for the gear shift. Dashed line 550 represents an amount of time it takes to move the shifter and dog clutch sleeve far enough to achieve a stable torque transfer capacity (e.g., the dog clutch having capacity to transfer torque demanded by the vehicle driver).

The fourth plot from the top is a plot of a synchronous phase state for a gear shift versus time. The vertical axis represents the synchronous phase state for the gear shift. The horizontal axis represents time and time increases from the left side of the plot to the right side of the plot. Solid line 510 represents the synchronous phase state for the gear shift.

The fifth plot from the top is a plot of an engagement phase state for a gear shift versus time. The vertical axis represents the engagement phase state for the gear shift. The horizontal axis represents time and time increases from the left side of the plot to the right side of the plot. Solid line 512 represents the engagement phase state for the gear shift.

At time t0, the first gear is engaged and the shift actuator is in a fully engaged position. The speed difference is zero and the estimated engagement time is zero. The gear shift has not started so the synchronous phase state is not asserted and the engagement phase is not asserted.

At time t1, a gear shift is initiated and a disengagement phase of the presently engaged gear (e.g., the off-going gear) begins to be release by adjusting the position of the shifter shortly after time t1. The rotational speed difference between the speed of the intermediate shaft and the rotational speed of the on-coming gear jumps up to a higher value. The synchronization phase is not active and the engagement phase is not active.

At time t2, the shift actuator has passed through its mid-point or center of travel. The target shifter position advances toward engaging the second gear. The rotational speed difference between the on-coming gear and the intermediate shaft is unchanged. The synchronous phase begins and the electric machine speed is adjusted to drive the rotational speed of the on-coming gear toward the rotational speed of the intermediate shaft. The estimated engagement time begins to be calculated shortly after time t2 and the estimated engagement time declines as time progresses and the rotational speed of the on-coming gear moves toward the rotational speed of the intermediate shaft. The engagement phase is state is not asserted.

At time t3, the estimated amount of time it takes for the rotational speed difference between the on-coming gear and the intermediate shaft to reach zero or a predefined value is less than or equal to the time it takes to move the shifter, shift fork, and sleeve to the engaged position. Therefore, the synchronization phase ends and the engagement phase begins. The rotational speed difference between the rotational speed of the on-coming gear and the intermediate shaft rotational speed continues to decline. The target shift actuator position changes to a full engagement position and the actual shifter position follows the target after a short lag period. The engagement phase ends shortly after time t3 when the actual shifter position matches the target shifter position.

Figure 6:
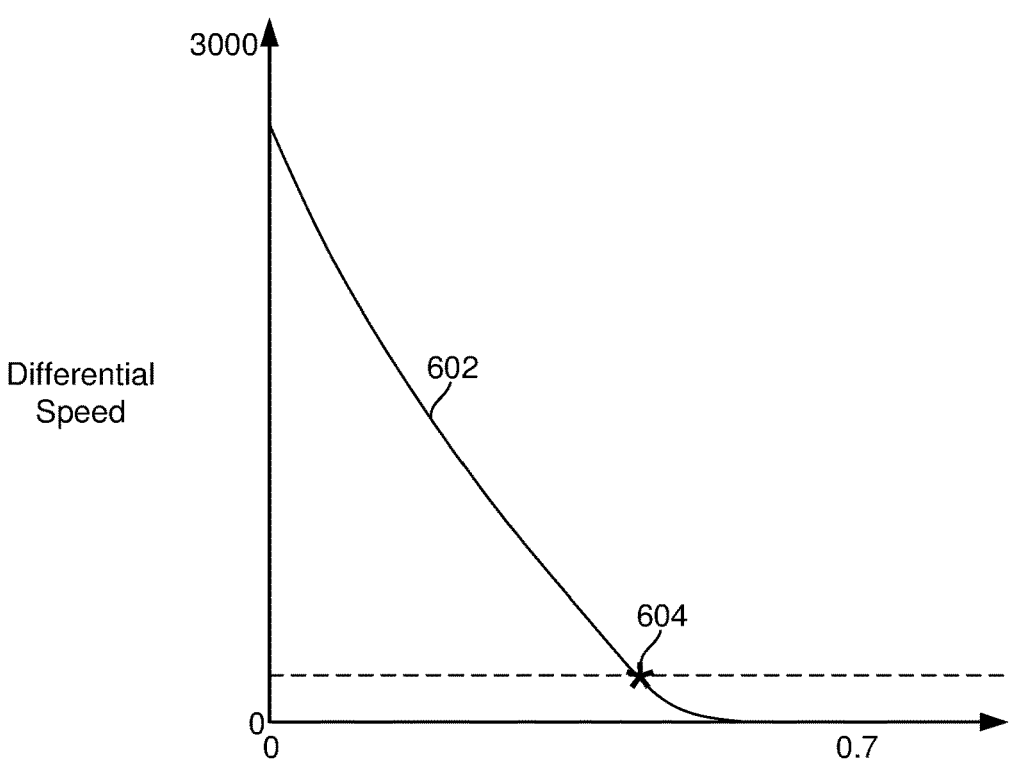
FIG. 6 shows a differential speed profile between transmission shaft speeds during transmission gear shifting.

Referring now to FIG. 6, a plot of an example desired speed differential or speed difference profile during a synchronous phase of a transmission gear shift is shown. The vertical axis represents a rotational speed difference between a rotational speed of an intermediate shaft and a rotational speed of an on-coming gear (e.g., a gear that is in the process of being engaged). The horizontal axis represents time and time increases from the left side of the plot to the right side of the plot. Trace 602 represents the rotational speed difference between the rotational speed of the intermediate shaft and the rotational speed of the on-coming gear.

At a time of zero, the rotational speed difference between the intermediate shaft rotational speed and the on-coming gear rotational speed is at a high value. The electric machine speed is adjusted by adjusting torque of the propulsion source to near or at maximum torque of the propulsion source so that the rotational speed difference is reduce quickly. As the rotational speed difference approaches zero, the electric machine torque is adjusted further to reduce the rate of rotational differential speed change. In one example, upon approaching a target differential speed, the control torque adjustments become less substantial and they may resemble a first order closed-loop transfer function of the form:

$$\frac{\omega_d(s)}{\omega_{d,target}(s)} \cong \frac{1}{1 + \tau s}$$

where $\omega_d$ is the rotational speed difference between the rotational speed of the intermediate shaft rotational speed and the on-coming gear rotational speed, s is a Laplace complex variable, and $\omega_{d,target}$ is a target rotational speed difference.

The motion equation of the adrift vehicle forced by rolling resistance and track slope is a first order one in velocity (namely $\dot{v}m=F$ where m is the vehicle mass and F is the sum of all the applied forces and $\dot{v}$ is rate of vehicle speed change) as well as motion equation for the propulsion source, disconnected from the load, is a first order one in angular velocity, namely $\dot{\omega} J=T$, where J is the angular mass of the rotor, T is propulsion source torque, and $\dot{\omega}$ is the propulsion source rate of angular velocity change and of the transmission elements that are permanently connected to the propulsion source (e.g., components upstream the dog clutch). The differential speed $\omega_d$ is a linear combination of vehicle velocity and motor angular velocity, both first order systems as seen, its dynamics resemble a first order system.

This effect is visible in FIG. 6 where the transition from a closed-loop response working in torque saturation to a less aggressive speed control is marked by an asterisk. The system time constant $\tau$ is lower bounded by the system physical parameters and it may be relaxed at will to seek a compromise between speed and smoothness of the shifting maneuver. The controllability of the final phase of the synchronization allows for a simplified prediction of the moment when the differential speed will be null or within a defined range. The non-overshooting behavior of the first order system is of uttermost relevance on this phase of the speed synchronization phase. The described strategy may minimize the rotational speed synchronization time, which may allow for a repeatable engagement phase.

Figure 7:
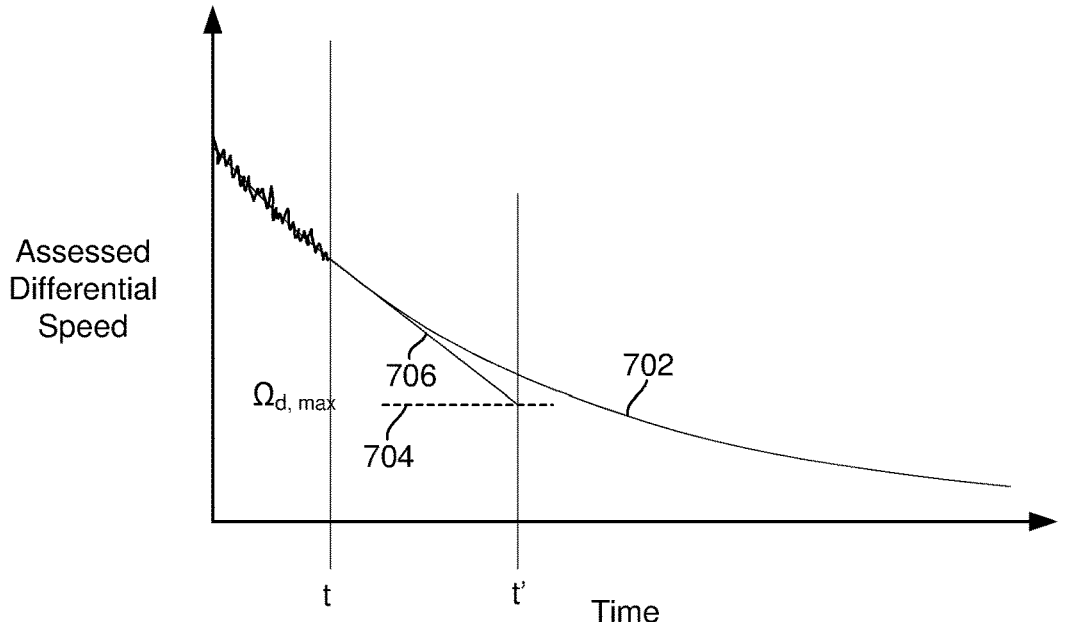
FIG. 7 shows a graphic of how a differential speed between two transmission shafts may be predicted.

Referring now to FIG. 7, a visualization of an example way to determine when the rotational speed differential is expected or predicted to reach a maximum differential rotational speed where the shifter may be adjusted to engage the on-coming gear. The vertical axis represents a rotational speed difference between a rotational speed of an intermediate shaft and a rotational speed of an on-coming gear (e.g., a gear that is in the process of being engaged). The horizontal axis represents time and time increases from the left side of the plot to the right side of the plot. Trace 702 represents the rotational speed difference between the rotational speed of the intermediate shaft and the rotational speed of the on-coming gear. Line 706 represents the expected or predicted rotation speed difference trajectory from a time along trace 702. Horizontal line 704 represents a maximum rotational speed difference between the rotational speed of the intermediate shaft and the rotational speed of the on-coming gear where the shifter may adjust the dog clutch to engage the on-coming gear.

The evolution of the rotational speed difference between the rotational speed of the intermediate shaft and the rotational speed of the on-coming gear may not be linear, but it may be linearized in the form of $\omega_d=b_0+b_1t$ and defining $a=\omega_d$, the dynamic of the differential speed may be written in state-space representation as:

$$\dot{x} = \begin{pmatrix} \dot{\omega}_d \\ \dot{a} \end{pmatrix} = \begin{pmatrix} 0 & 1 \\ 0 & 0 \end{pmatrix}\begin{pmatrix} \omega_d \\ a \end{pmatrix} = Ax$$

where A is the state matrix, x is the state vector, and the dot denotes derivative with respect to time. Defining the output vector y as the actual differential speed as measured by the transmission's sensors, its matrix representation is:

$$y = \omega_d = (1\ 0)\begin{pmatrix} \omega_d \\ a \end{pmatrix} = Cx$$

where C is the output matrix. A state observer may be defined for the system starting from state matrix A and the output matrix C as:

$$\dot{\hat{x}} = A\hat{x} - L(\hat{y} - y) = A\hat{x} - L(C\hat{x} - y) = (A - LC)\hat{x} + L\omega_d$$

$$\hat{y} = C\hat{x}$$

where L is the observer gain matrix and the variables with the hat (ˆ) are the observer state $\hat{x}$ and the observer output vector $\hat{y}$. Defining the error as the difference between the system state vector and the observer state vector: $e \triangleq x-\hat{x}$, the error dynamic may be described by the equation:

$$\dot{e} = \dot{x} - \dot{\hat{x}} = A(x-\hat{x}) + L(\hat{y}-y) = Ae + L(C\hat{x}-Cx) = Ae - LCe = (A-LE)e$$

where the error e converges in time to zero provided matrix (A-LC) is definite-negative. The observer gain matrix entries may be chosen such that the error is reasonably small in a time that giver the system state assessment an effectively usable value.

Once a good system state is available, an estimate of the time t' when the differential speed between the rotational speed of the intermediate shaft and the rotational speed of the on-coming gear is null or a defined value $\omega_{d,max}$ (e.g., a maximum rotational speed differential where the on-coming gear may be engaged). The following equation defines a time lapse (t'−t) shown in FIG. 7 to have the differential rotational speed be at the target or requested value $\omega_{d,max}$:

$$\hat{\omega}_d(t) = \omega_{d,max} = \hat{a}(t) \cdot (t' - t)$$

Figure 8:
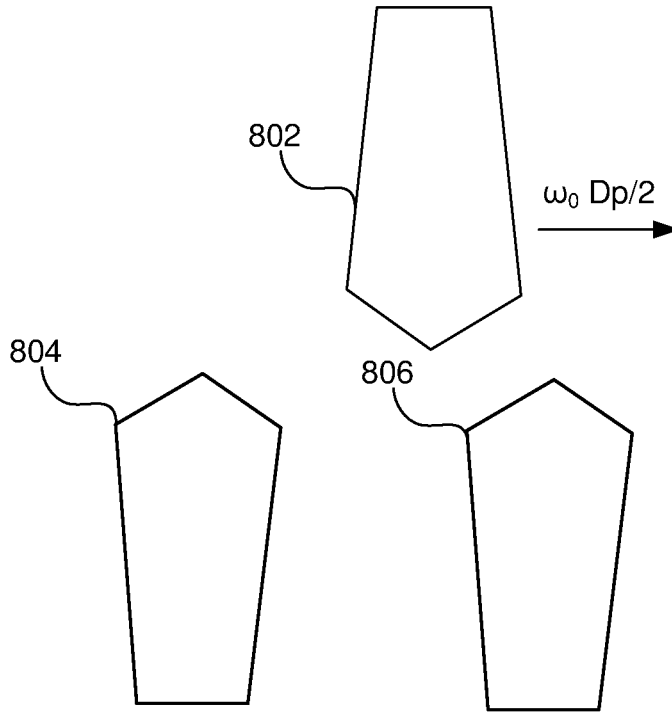
FIGS. 8-14 show plan views of example teeth of a dog clutch in a range of positions.

Turning now to FIG. 8, a plan view of example dog clutch teeth is shown. Tooth 802 is from the upper one the sleeve, whereas the teeth 804 and 806 are spline teeth (e.g., 306 of FIG. 3) from either of gear 252 or gear 256 of FIG. 2. The sleeve is spinning at the same speed of gear 258 in FIG. 2, and it ultimately gets its angular velocity from the vehicle wheels while the gears obtain their angular velocity from the electric motor. The difference of the two angular velocities is $\omega_d$ as seen and in a tangential direction the teeth of the dog clutch are moving with relative speed $\omega_d D_p/2$, where $D_p$ is the pitch diameter of the engagement ring spline. The sleeve may have a perpendicular motion (axial movement driven by a shift fork, top to bottom in FIG. 8) to engage the locking ring teeth.

Figure 9:
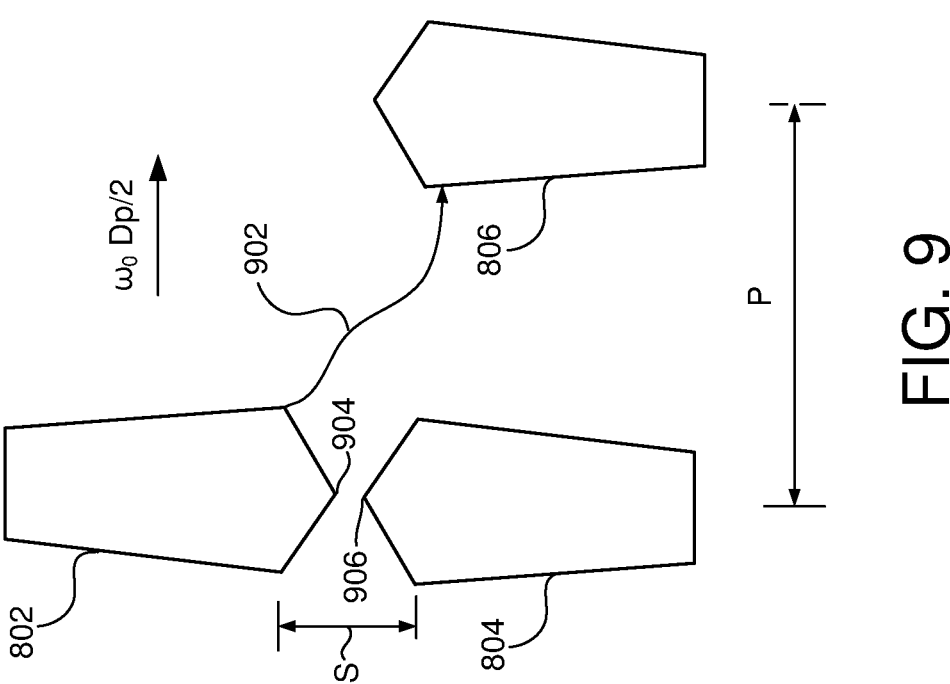

FIG. 9 is a plan view of the same dog clutch teeth of FIG. 8 and a view of an example trajectory 902 for a tooth 802 of a sleeve to engage spline teeth 804 and 806. FIG. 9 depicts the start of the engagement stroke S of a transmission gear shift and it defines the origin of the time axis and an example trajectory 902 of the tooth 802. The engagement may be considered achieved when the undercut flanks of the teeth come in contact or, to put it another way, when the sleeve travels the stroke S, as visible in FIG. 10. The stroke S is not a defined quantity but the space the sleeve travels to land into a reliably engaged position. For a successful engagement, the following two inequalities are satisfied:

$$\int_0^{t^*} v_A(t)dt = \tilde{v}_A t^* > s$$

$$\int_0^{t^*} \frac{\omega_d(t)D_p}{2dt} < \frac{p}{2} = \frac{D_p}{z}$$

where $v_A(t)$ is the speed profile of the shifter actuator, $\tilde{v}_A$ is the sleeve average speed during the maneuver, p is the pitch of the teeth as measured on the pitch diameter, z is an actual total number of teeth, and t* is the time it takes to move the sleeve far enough to achieve a stable torque transfer capacity for the dog clutch. The equation is conservative since the cavity between two teeth is wider than the tooth thickness. The shifter actuator speed and the differential rotational speed may be defined by the control strategy and they may be constrained by boundary conditions. The actuator speed may be upper constrained by a maximum flow of a valve that controls flow at a valve that controls pressure in the actuator. The maximum rotational differential speed $\omega_{d,max}$ may be upper constrained to reduce a possibility of shift shock and engagement noise. An upper constraint to the duration of the engagement phase may be derived from the second inequality as:

$$t^* < \frac{p}{\omega_{d,max}D_p} = \frac{\pi}{z\omega_{d,max}}$$

Replacing this inequality with the first inequality provides a direct link between the shifter actuator average speed and the maximum differential speed between the rotational speed of the intermediate shaft and the rotational speed of the on-coming gear that portends successful gear engagement yields:

$$\tilde{v}_A \frac{p}{sD_p} = \tilde{v}_a \frac{v}{sz} > \omega_{d,max}$$

This inequality may be conservative provided that the speed profile is monotonic. A speed increasing shift actuator assures that the condition is satisfied.

Figure 10:
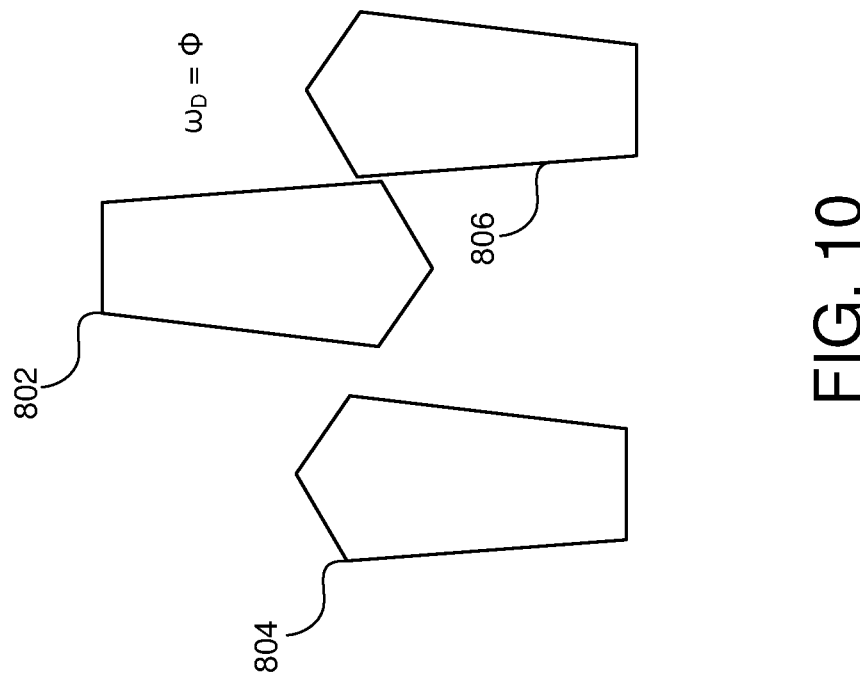
Figure 12:
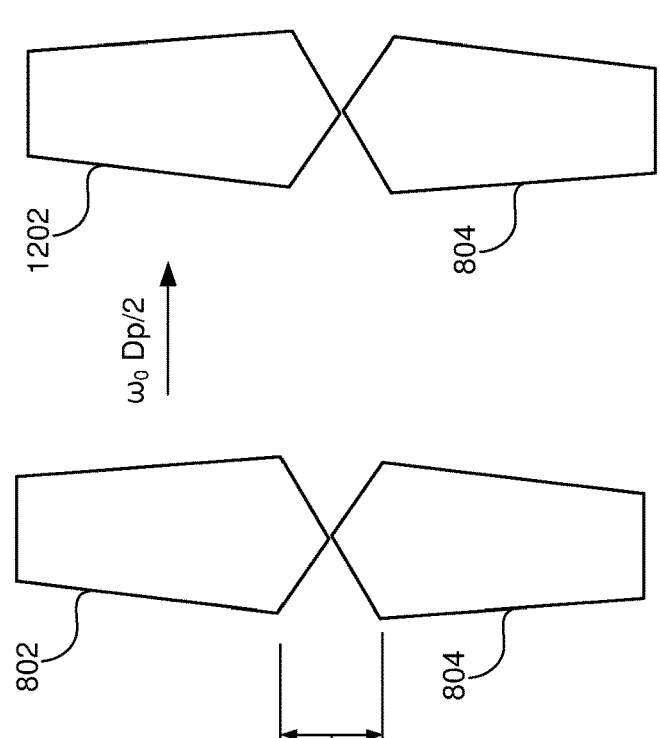
Figure 11:
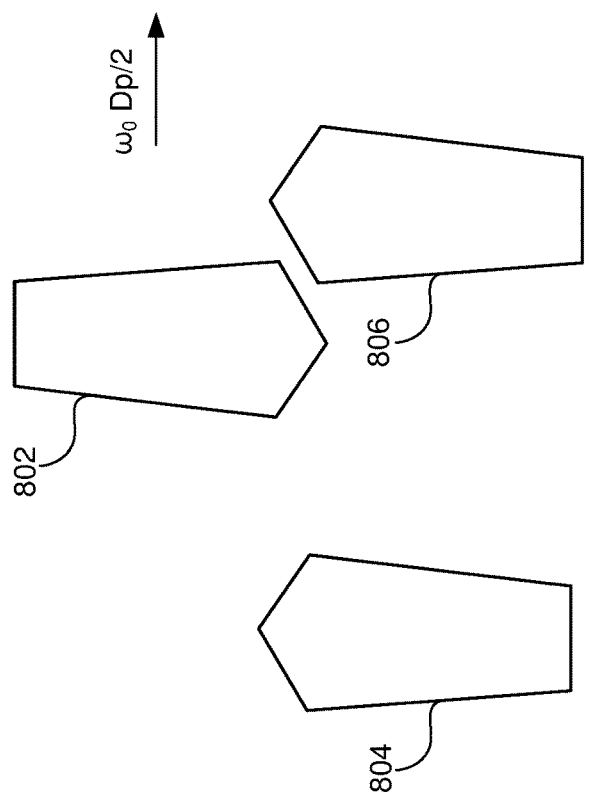

FIG. 10 is a plan view of the same dog clutch teeth shown in FIG. 8 now shown in a partially engaged position. FIG. 11 is a plan view of the same dog clutch teeth shown in FIG. 8 now shown in a position where the teeth may repel each other as the intermediate shaft and the propulsion source rotate. FIG. 12 is a plan view of the same dog clutch teeth shown in FIG. 8 and an additional tooth 1202 in a position where the teeth may begin to interfere with each other during rotation of the intermediate shaft and the propulsion source. FIG. 13 shows a plan view of two teeth shown in FIG. 8 and forces that may operate on the two teeth. FIG. 14 is a plan view of the same dog clutch teeth shown in FIG. 8 and an additional tooth 1402 in a position where the teeth are fully engaged, thereby fully engaging the on-coming gear.

FIG. 9 shows a tip 904 of the sleeve tooth well apart from the tip 906 of the gear tooth 804 and in this condition the relative speed may be relevant allowing for the synchronization to take place. A minimum dependable residual distance of two times the tip height h is applied during the synchronization. Tip high 2·h(2h) is shown in FIG. 12 and in one example it may be 1.5 millimeters. Note that if the sleeve travels this distance, it brings direct contact of the undercut flank of the teeth. From this time onward, the dog clutch has the capability to transfer torque between the sleeve and the on-coming gear even if the sleeve is far from reaching its end-stop. When the sleeve end-stop 311 of FIG. 3 reaches the gear spline tip, the dog clutch achieves the maximum overlap Δ, as shown in FIG. 14. The Δ is around two millimeters in one example. In the above engagement inequality, the residual stroke s appears at the denominator. Keeping s at a minimum value helps in fulfilling the condition. However, the rate of speed change transient of the gear shift actuator may result in a lower average speed $\tilde{v}_A$, thereby decreasing a probability of a successful engagement that is enhanced having the peak speed of the gear shifter actuator when the teeth's tips are nearly in contact. For this reason, the engagement operation may begin with the sleeve further apart from the minimal reliable distance.

The hydraulic gear shifter actuator speed, its rate of speed change transient together with the dependencies on the oil temperature are known and anyhow may be calibrated with a learning function. Sleeve position is known via sensor 216 of FIG. 2, so as it is known, the distance to be travelled to achieve the engagement may be determined. The engaged position may be calibrated. Therefore, the time lapse that the sleeve needs to travel to reach the tip-to-tip position as shown in FIG. 12 at its maximum speed may be determined. A state observer may be applied to predict in real time the time lapse to achieve the differential speed $\omega_{d,max}$. When the two time-lapses are identical, the sleeve is launched via operating the shifter actuator in feed forward towards the engaged position.

The configuration depicted in FIG. 12 is a desired or requested-case scenario and, provided the engagement inequality is satisfied, will result in a successful engagement. The angular position of the tips is anyhow random and the configuration depicted in FIG. 11 may be much more likely to happen resulting in an interference between the tip flanks. The choice of $\omega_{d,max}$ is such that the relative speed is in the order of tens of millimeters per second to reduce a possibility of degradation, wear, and interference noise. FIG. 13 shows the tips' flanks resting one upon the other immediately after such interference takes place. FIG. 13 also represents the force that the sleeve applies to the engagement ring tooth in the solid line and the reaction to the sleeve in dashed line. The component of the reaction force $F'_R$ parallel to the tip flank $F_S$ is the friction and it will keep the sleeve in a stalled position as long as $F_S$ is smaller than $\mu F_N$, with $\mu$ being the static friction coefficient. The angle between the resulting force $F_R$ and the tip flank depend solely on the ratio between the actuator force $F_A$ and the tangential force delivered by the motor $F_T$, whereas the ratio of the friction force $F_S$ and the normal force $F_N$ depends both on the angle and on the tip angle. The engagement is facilitated for sharpest tip and minimum tangential force $F_T$; however, a pointed tip is not viable because of increased brittleness of the tooth. Moreover, it is an observed behavior of dog clutches or synchronizers, an increased probability of missed engagement with transmission ageing due to the wear flattening the tooth tip. For this reason, it is desirable to have the tangential force null at the dog ring during the engagement.

Thus, the system of FIGS. 1-4 and 6-14 provides for an electric propulsion system, comprising: an electric machine; a step gear ratio transmission including at least two gear ratios, the transmission including a shifter actuator; and one or more controllers including executable instructions that cause the one or more controllers to estimate an amount of time for a differential speed between a rotational speed of an on-coming gear and a rotational speed of a transmission shaft to be less than a threshold rotational speed. In a first example, the electric propulsion system includes where threshold rotational speed is a maximum rotational speed difference between the rotational speed of the on-coming gear and the rotational speed of the transmission shaft for engaging the on-coming gear. In a second example that may include the first example, the electric propulsion system includes where the amount of time is determined via an observer. In a third example that may include one or both of the first and second examples, the electric propulsion system further comprises additional executable instructions that cause the one or more controllers to estimate an amount of time to engage the on-coming gear via the shifter actuator based on an average speed of the shifter actuator. In a fourth example that may include one or more of the first through third examples, the electric propulsion system further comprises additional executable instructions that cause the one or more controllers to reduce the differential speed between the rotational speed of the of the on-coming gear and the rotational speed of the transmission shaft via operating the electric machine in a speed control mode and adjusting speed of the electric machine when an off-going gear is disengaged and while the step gear ratio transmission is in a neutral state. In a fifth example that may include one or more of the first through fourth examples, the electric propulsion system includes where speed of the electric machine is adjusted during a speed synchronization phase of a gear shift. In a sixth example that may include one or more of the first through fifth examples, the electric propulsion system includes where the shift actuator is mechanically coupled to a shift fork and a dog clutch, and where the transmission shaft is a transmission output shaft. In a seventh example that may include one or more of the first through sixth examples, the electric propulsion system includes where the transmission shaft is an intermediate shaft.

Thus, the system of FIGS. 1-4 and 6-14 also provides for an electric propulsion system, comprising: an electric machine; a step gear ratio transmission including at least two gear ratios, the transmission including a shifter actuator; and one or more controllers including executable instructions that cause the one or more controllers to estimate an amount of time for a differential speed between a rotational speed of an on-coming gear and a rotational speed of a transmission shaft to be less than a threshold rotational speed, and additional instructions that cause the one or more controllers to adjust a position of the shift actuator in response to the amount of time for the differential speed between the rotational speed of the on-coming gear and the rotational speed of the transmission shaft being less than the threshold rotational speed. In a first example, the method further comprises additional executable instructions to operate the electric machine in a speed control mode while adjusting the position of the shift actuator. In a second example that may include the first example, the method includes where the electric machine is operating in a speed control mode during a synchronization phase of a gear shift. In a third example that may include one or both of the first and second examples, the method includes where the transmission shaft is an intermediate shaft, and where the position of the shift actuator is adjusted from a neutral position to a reliably engaged position. In a fourth example that may include one or more of the first through third examples, the method includes where the shift actuator is mechanically coupled to a dog clutch.

Turning now to FIGS. 15 and 16, a flowchart of a method for shifting a transmission is shown. The transmission being shifted may be of the type that is shown in FIGS. 1 and 2. The method of FIGS. 15 and 16 may be incorporated into and may cooperate with the system of FIGS. 1-3. Further, at least portions of the method of FIGS. 15 and 16 may be incorporated as executable instructions stored in non-transitory memory of one or more controllers while other portions of the method may be performed via the one or more controllers transforming operating states of devices and actuators in the physical world.

At 1502, method 1500 operates the vehicle's traction motor or propulsion source in a torque control mode. Torque control mode allows a speed of the traction motor to vary while the torque of the traction motor follows a requested torque value or request. Thus, the traction motor torque is adjusted to follow a requested or commanded torque while the traction motor speed is allowed to vary. Method 1500 proceeds to 1504.

At 1504, method 1500 judges whether or not conditions are present for a transmission gear shift to be performed. In one example, a transmission may be shifted according to a shift schedule that is stored in controller memory. The shift schedule may request shifts based on driver demand torque and present vehicle speed. If method 1500 judges that conditions are present for a gear shift, the answer is yes and method 1500 proceeds to 1506. Otherwise, the answer is no and method 1500 proceeds to exit.

At 1506, method 1500 generates a null torque or zero torque at the dog clutch that controls engagement of the off-going gear. Method 1500 may adjust torque of the traction motor to achieve null or zero torque transfer through the dog clutch of the off-going gear while the traction motor continues to operate in a torque control mode. Method 1500 proceeds to 1508.

At 1508, method 1500 disconnects the off-going gear from the intermediate shaft and/or the transmission output shaft by moving the dog clutch toward its neutral position as shown in FIG. 4 where dog clutch teeth are not engage with spline teeth of the off-going gear or spline teeth of the on-coming gear. Method 1500 proceeds to 1510.

At 1510, method 1500 switches the operating mode of the traction motor from torque control to speed control. In speed control mode, the rotational speed of the traction motor is commanded to follow a speed request or command while the torque of the traction motor is allowed to vary. Method 1500 also adjusts the rotational speed of the traction motor so that a rotational speed of an on-coming gear (e.g., gear that is to be engaged during the shift) matches a rotational speed of an intermediate shaft, or alternatively, to a rotational speed of a transmission output shaft. The transmission gear shifter adjusts a position of the dog clutch sleeve to a position where the dog clutch is reliably disengaged from the off-going gear and the on-coming gear. This allows the speed of the on-coming gear, which is coupled to the traction motor, to be adjusted independent of vehicle speed. In one example, method 1500 adjusts speed of the traction motor so that a differential speed between the on-coming gear and the intermediate shaft or the transmission output shaft is reduced toward a value of zero as shown in FIG. 6. Method 1500 proceeds to 1512, 1514, and 1540.

At 1512, method 1500 measured the rotational speed of the propulsion source or motor. The rotational speed may be measured via a position sensor that senses teeth of a gear or via an analog tachometer. Method 1500 proceeds to 1516.

At 1514, method 1500 measured the rotational speed of the transmission shaft transmission, or alternatively, a rotational speed of an intermediate shaft in the transmission. The rotational speed of the intermediate shaft of the transmission may be inferred by dividing the rotational speed of the output shaft of the transmission by a ratio of gears between the transmission intermediate shaft and the transmission output shaft. Alternatively, the intermediate shaft rotational speed may be measured by a sensor. Method 1500 proceeds to 1516.

At 1516, method 1500 determines a differential speed. In one example, method 1500 may determine a differential speed as the variance between the rotational speed of the engagement sleeve (e.g., 802) and the rotational speed of the teeth (804/806). These rotational speeds can be measured either directly or indirectly using speed sensors positioned on a separate interconnected shaft, taking into account the gear ratios. Method 1500 proceeds to 1518 and 1520.

At 1518, method 1500 adjusts or controls the motor speed. In one example, method 1500 may operate the vehicle's traction motor in a speed control mode and adjust motor speed to reduce a differential speed between teeth (e.g., 804/806) and the corresponding engagement sleeve (e.g., 802). Method 1500 returns to 1512.

At 1520, method 1500 applies an observer to estimate an amount of time (t') it will take for the differential speed between the on-coming gear and the intermediate shaft, or alternatively the transmission output shaft to be less than or equal to a maximum rotational speed differential between the on-coming gear and the intermediate shaft, or alternatively, the transmission output shaft for engaging the on-coming gear via the dog clutch (e.g., $\omega_{d,max}$). The observer may be as discussed in the description of FIG. 7 and the estimate of the amount of time (t') to reduce the differential speed to the maximum rotational speed differential (e.g., $\omega_d$,max) may be determined as discussed with regard to FIG. 7. Method 1500 supplies the amount of time (t') to step 1522.

At 1540, method 1500 determines a position of the transmission gear shift actuator, which is indicative of shift fork position and dog clutch sleeve position since these devices are mechanically coupled together. The position of the transmission gear shift actuator may be determined via a position sensor that supplies a signal that is indicative of transmission gear shift actuator position to a controller. Method 1500 proceeds to 1542.

At 1542, method 1500 estimates or predicts an amount of time it will take to move the shift actuator to a position to engage the on-coming gear. In one example, the amount of time it will take to move the shift actuator from its present position to a position where the on-coming gear is engaged (e.g., t*) may be determined via solving the equations mentioned in the description of FIG. 7 for t*. Method 1500 supplies the amount of time to move the shift actuator t* to step 1522.

At 1522, method 1500 judges whether or not the amount of time (t') it will take for the differential speed between the on-coming gear and the intermediate shaft, or alternatively the transmission output shaft to be less than or equal to a maximum rotational speed differential between the on-coming gear and the intermediate shaft, or alternatively, the transmission output shaft is less than or equal to the amount of time it will take to move the shift actuator from its present position to a position where the on-coming gear is engaged (e.g., t*). If so, the answer is yes and method 1500 proceeds to 1524. Otherwise, the answer is no and method 1500 returns to 1512, 1514, and 1540.

At 1524, method 1500 commands the shifter actuator to engage the on-coming gear. The on-coming gear may be engaged by moving the dog clutch sleeve to engage spline teeth of the on-coming gear. Method 1500 proceeds to 1526.

At 1526, method 1500 determines or reads the gear shifter actuator position via a position sensor. Method 1500 proceeds to 1528.

At 1528, method 1500 judges whether or not the gear shifter actuator is at an end of stroke position (e.g., a position where the on-coming gear is reliably engaged). If so, the answer is yes and method 1500 proceeds to 1530. Otherwise, the answer is no and method 1500 returns to 1524.

At 1530, method 1500 changes the operating mode of the propulsion source or traction motor to a torque control mode and torque of the traction motor is adjusted to the driver demand torque. Method 1500 proceeds to exit.

Thus, method 1500 adjusts a position of a shift actuator in response to an amount of time estimated for a differential rotational speed between an on-coming gear and a rotational speed of a shaft (e.g., intermediate shaft or transmission output shaft) to be less than a threshold speed (e.g., a maximum rotational speed difference for dog clutch engagement).

The methods of FIGS. 15 and 16 provide for a method for operating a vehicle, comprising: adjusting a shift actuator in response to a predicted an amount of time for a clutch actuator to move from a first position to a second position being less than or equal to an amount of time for a differential speed to be a predetermined differential speed. In a first example, the method includes where the first position is a position where a dog clutch is disengaged from an off-going gear and where the second position is a reliably engaged position for an on-coming gear. In a second example that may include the first example, the method includes where the amount of time for the differential speed to be the predetermined differential speed is based on output of an observer. In a third example that may include one or both of the first and second examples, the method includes where the predetermined differential speed is a maximum speed differential between a rotational speed of a gear and a rotational speed of a shaft for engaging a dog clutch. In a fourth example that may include one or more of the first through third examples, the method includes where the differential speed is a rotational speed difference between a rotational speed of an on-coming gear and a rotational speed of a shaft. In a fifth example that may include one or more of the first through fourth examples, the method includes where the shaft is an intermediate shaft. In a sixth example that may include one or more of the first through fifth examples, the method further comprises operating an electric machine in a speed control mode to reduce the differential speed while adjusting the shift actuator.

Note that the example control and estimation routines included herein may be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology may be applied to electric vehicles and hybrid vehicles including induction and synchronous electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric propulsion system, comprising:
an electric machine;
a step gear ratio transmission including at least two gear ratios, the step gear ratio transmission including a shifter actuator; and
one or more controllers including executable instructions that cause the one or more controllers to estimate an amount of time for a differential speed between a rotational speed of an on-coming gear and a rotational speed of a transmission shaft to be less than a threshold rotational speed.

2. The electric propulsion system of claim 1, where threshold rotational speed is a maximum rotational speed difference between the rotational speed of the on-coming gear and the rotational speed of the transmission shaft for engaging the on-coming gear.

3. The electric propulsion system of claim 2, where the amount of time is determined via an observer.

4. The electric propulsion system of claim 3, further comprising additional executable instructions that cause the one or more controllers to estimate an amount of time to engage the on-coming gear via the shifter actuator based on an average speed of the shifter actuator.

5. The electric propulsion system of claim 4, further comprising additional executable instructions that cause the one or more controllers to reduce the differential speed between the rotational speed of the of the on-coming gear and the rotational speed of the transmission shaft via operating the electric machine in a speed control mode and adjusting speed of the electric machine when an off-going gear is disengaged and while the step gear ratio transmission is in a neutral state.

6. The electric propulsion system of claim 5, where speed of the electric machine is adjusted during a speed synchronization phase of a gear shift.

7. The electric propulsion system of claim 1, where the shifter actuator is mechanically coupled to a shift fork and a dog clutch, and where the transmission shaft is a transmission output shaft.

8. The electric propulsion system of claim 1, where the transmission shaft is an intermediate shaft.

9. An electric propulsion system, comprising:

an electric machine;

a step gear ratio transmission including at least two gear ratios, the step gear ratio transmission including a shifter actuator; and one or more controllers including executable instructions that cause the one or more controllers to estimate an amount of time for a differential speed between a rotational speed of an on-coming gear and a rotational speed of a transmission shaft to be less than a threshold rotational speed, and additional instructions that cause the one or more controllers to adjust a position of the shifter actuator in response to the amount of time for the differential speed between the rotational speed of the on-coming gear and the rotational speed of the transmission shaft being less than the threshold rotational speed.

10. The electric propulsion system of claim 9, further comprising additional executable instructions to operate the electric machine in a speed control mode while adjusting the position of the shifter actuator.

11. The electric propulsion system of claim 10, where the electric machine is operating in the speed control mode during a synchronization phase of a gear shift.

12. The electric propulsion system of claim 9, where the transmission shaft is an intermediate shaft, and where the position of the shifter actuator is adjusted from a neutral position to a reliably engaged position.

13. The electric propulsion system of claim 9, where the shifter actuator is mechanically coupled to a dog clutch.

\* \* \* \* \*